| United States Patent [19]
Droste | [11] 3,760,064
[45] Sept. 18, 1973 |

[54] PROCESS FOR THE PRODUCTION OF NEUTRAL CALCIUM HYPOCHLORITE CRYSTALS

[75] Inventor: Theodore Carl Droste, Johannesburg, South Africa

[73] Assignee: Klipfontein Organic Products Corporation Limited, Transvaal, South Africa

[22] Filed: Oct. 21, 1971

[21] Appl. No.: 191,251

[30] Foreign Application Priority Data
Oct. 27, 1970 South Africa............................ 7296

[52] U.S. Cl.................. 423/474, 423/158, 423/164
[51] Int. Cl. ...................... C01b 11/00, C01f 11/00
[58] Field of Search..................... 423/474, 158, 164; 23/86

[56] References Cited
UNITED STATES PATENTS
2,469,901  5/1949  Sprauer............................. 423/474

FOREIGN PATENTS OR APPLICATIONS
194,064  5/1967  U.S.S.R............................. 423/474

OTHER PUBLICATIONS

Hackh's "Chem. Dictionary," by J. Grant, Fourth Ed., 1969, pages 264 and 265, Published by McGraw-Hill, Book Co., New York.

Primary Examiner—Edward Stern
Attorney—Irvin S. Thompson et al.

[57] ABSTRACT

A process for producing crystals of neutral calcium hypochlorite of good filterability from a lime containing about 600 or more parts per million by weight of iron as Fe comprising reacting a slurry of lime with a chlorinating agent to form crystals of a basic calcium hypochlorite, preferably dibasic, adding a barium, zinc, strontium, cadmium, silver or mercury salt to the slurry to precipitate the ferrate and/or ferrite ions as an insoluble or substantially insoluble salt, allowing the basic crystals to settle out of the slurry, removing the supernatant suspension containing the salt from the crystals, and converting the basic crystals into crystals of neutral calcium hypochlorite.

13 Claims, 1 Drawing Figure

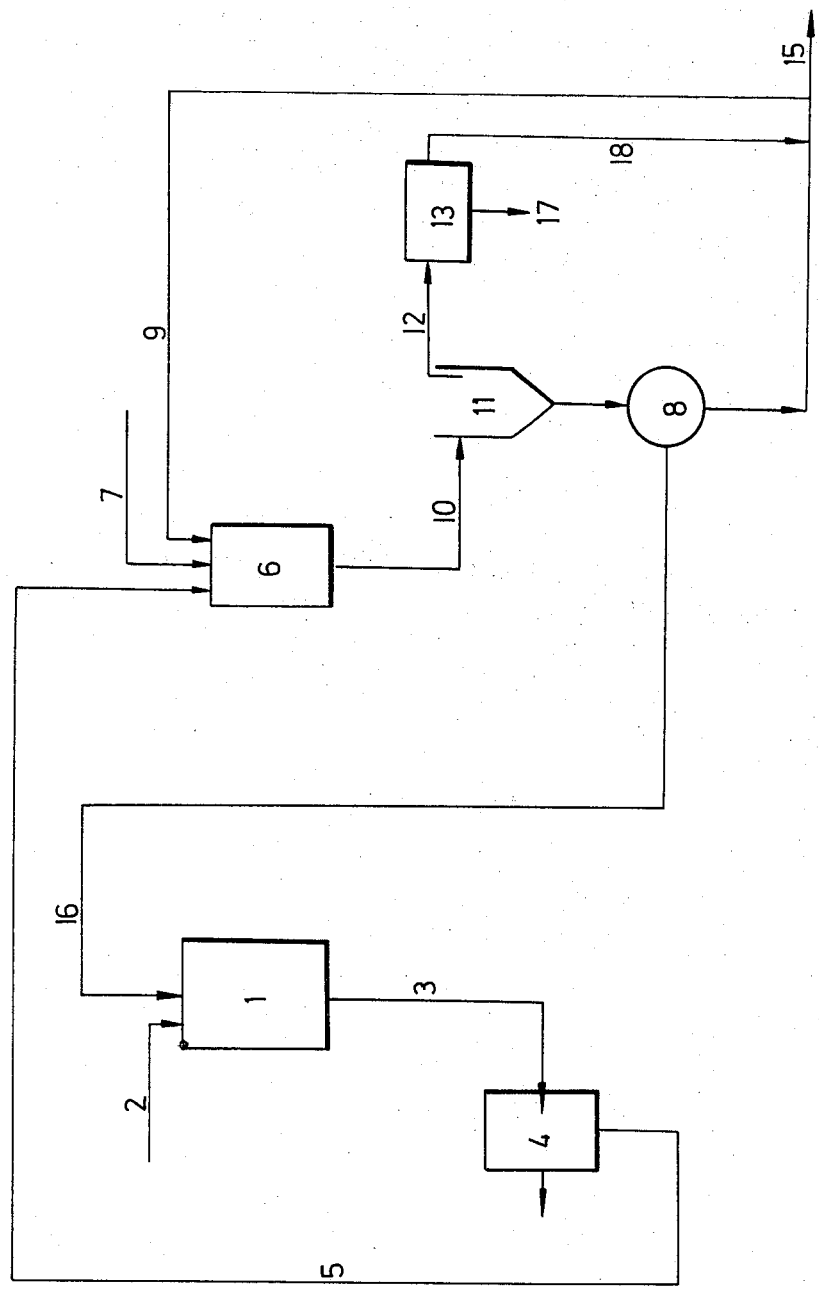

PROCESS FOR THE PRODUCTION OF NEUTRAL CALCIUM HYPOCHLORITE CRYSTALS

This invention relates to the production of crystals of neutral calcium hypochlorite.

Neutral calcium hypochlorite may be produced on a commercial scale by chlorinating a slurry of lime. However, the crystals so formed are generally small and trap large quantities of mother liquor. The cakes of the hypochlorite on filtration therefore, contain a large quantity of impurities and, when dried, are too low in calcium hypochlorite to be commercially competitive. In short, the hypochlorite has poor filterability.

The present inventor has discovered that one of the major factors causing poor filterability of neutral calcium hypochlorite crystals is due to the presence of iron in the lime. In the oxidising atmosphere of the slurry during chlorination, the iron is oxidised to the ferrate ($FeO_4^{2-}$) and/or the ferrite ($FeO_3^{2-}$) ions.

If these ions are present in sufficient quantity to exceed the solubility of their calcium salts, small particles of ferrate and/or ferrite salts will be present in the slurry. The ferrate/ferrite particles act as nuclei on which the neutral calcium hypochlorite tends to grow, producing small and not easily filterable crystals. Furthermore, even if good crystals are produced, the filterability of these crystals remains poor due to the fact that the small ferrate and/or ferrite particles (in the form of calcium salts) blind the filtration medium, i.e. filter cloth or screen, precoat layer etc.

The inventor has noticed that if the iron concentration in the lime exceeds approximately 600 ppm by weight as Fe the above is true.

The problem of poor filterability manifests itself particularly with lime of high iron content, as is found in South Africa for example.

It is an object of the present invention to provide a method of producing neutral calcium hypochlorite crystals of good filterability from a lime containing a relatively high iron content.

According to the invention, there is provided a process for producing crystals of neutral calcium hypochlorite of good filterability from a lime containing about 600 or more parts per million by weight of iron as Fe comprising reacting a slurry of the lime with a chlorinating agent to form crystals of a basic calcium hypochlorite and converting the basic crystals into crystals of neutral calcium hypochlorite, characterised in that the conversion takes plase in a medium substantially free of undissolved iron compounds.

It is crucial to the process that the conversion from basic crystals to neutral crystals be carried out in a medium which is substantially free of undissolved iron compounds. This may be achieved in a number of ways, but preferably by substantially reducing the iron content of the system at an intermediate stage. For example, and preferably, an additive may be introduced into the slurry to form an insoluble or substantially insoluble salt with the iron-containing ions and the salt then separated from the basic crystals. The separation may be achieved by allowing the basic crystals to settle out of the slurry and removing the supernatant suspension containing the salt from the basic crystals. Preferably, the salt is formed by adding to the slurry ions selected from barium, strontium, cadmium, zinc, mercury and silver ions, preferably in the form of the chloride salt. The ions are advantageously introduced into the slurry during reaction with the chlorinating agent. Alternatively, the ions may be added to the slurry after the chlorination to a basic stage is complete.

When the step of settling the basic crystals out of the slurry occurs, it is advantageous to remove residual mother liquor from the crystals, e.g. by filtration, and then use at least a part of this mother liquor as a part of the slurry medium and as a part of the medium in which the conversion of the basic crystals to the neutral crystals takes place. The iron content of the mother liquor is, of course, negligible because of the prior removal of the insoluble or substantially insoluble ferrate and/or ferrite salt.

The amount of precipitating salt, when used, will depend on the particular type of salt, the quantity of iron in the lime and quantity and type of other impurities present in the lime.

Treatment of the slurry with precipitating salt is an effective way of reducing the iron content. After addition of the salt, the ferrate and/or ferrite ions are present in the form of an insoluble or substantially insoluble salt, the crystals of which are smaller in size (almost colloidal) than the basic calcium hypochlorite crystals. Thus, the basic calcium hypochlorite crystals settle faster than the crystals of the salt which tends to remain suspended in the mother liquor. The desired separation of salt from crystal may be achieved by employing the differential rate of settling. Subsequent removal of the supernatant suspension from the crystals of basic calcium hypochlorite results in the crystals being substantially free of ferrate and/or ferrite ions or undissolved iron. The settling can be achieved using any settling apparatus known in the art. For example, a known tank type settler, hydrocyclone or solid bowl centrifuge may be used.

Any chlorinating agent well-known in the art may be used in the reaction with the lime. For example suitable agents are chlorine gas, chlorine monoxide, a soluble or dissolved hypochlorite and hypochlorous acid. The chlorination is preferably controlled to produce crystals of dibasic calcium hypochlorite - $Ca(OCl)_2 \cdot 2Ca(OH)_2$, which is the least soluble of the basic forms and produces the largest crystals. These are flat hexagonal crystals which are easily produced despite the presence of dissolved or undissolved iron in the system. Alternatively, the chlorination may be controlled to produce the hemibasic crystals $3Ca(OCl)_2 \cdot 2Ca(OH)_2$ or a mixture of diabasic and hemibasic crystals. The hemibasic crystals take the form of needles.

Conversion of the basic crystals to neutral crystals may be advantageously achieved by making a slurry of the basic crystals and then chlorinating this slurry with any one or more of the reagents mentioned above. Neutral crystals of good purity and filterability are produced and can readily be recovered from the slurry by filtration.

The process of the invention may be batch or cyclic, but is preferably cyclic.

An embodiment of the invention will now be described with reference to the accompanying drawing which is a flow diagram of a cyclic process for producing neutral crystals of calcium hypochlorite of good filterability.

Referring to the drawing, in a cyclic process a slurry of lime is introduced into a reaction vessel 1 along line 2 to start the process. The slurry is chlorinated with chlorine gas at a temperature of about 20° C to 35° C to produce crystals of neutral calcium hypochlorite which are of poor filterability and which are discarded after filtration. The slurry is delivered along line 3 to filter 4 from which the filtrate saturated in calcium hypochlorite is delivered along line 5 to reaction vessel 6. In this reaction vessel the filtrate is reacted with a major quantity of a mixture of lime introduced along line 7 and reagent for forming an insoluble or substantially insoluble salt with ferrate and ferrite ions, as well as some filtrate from filter 8 introduced along line 9. The purpose of the filtrate introduced along line 9 is to thin the slurry and, since it is saturated with dissolved calcium hypochlorite, this dilution does not increase the dissolution of the neutral or basic calcium hypochlorites in the medium. In reaction vessel 6 dibasic calcium hypochlorite crystals (the hypochlorite from line 5 acting as chlorinating agent) are formed as well as ferrate and/or ferrite salts. The resultant slurry is then delivered along line 10 to settling tank 11 where due to differential settling rates the mother liquor suspension containing most of the ferrates and/or ferrites as salts are removed along line 12 to filter 13 while the basic crystals are moved along line 14 to filter 8 where residual mother liquor is removed. The filtrate is delivered along line 9 to reaction vessel 6 after removing excess along line 15. The crystals are removed from the filter and introduced into reaction vessel 1 along line 16 where they are slurried with water and a small quantity of lime along line 2. The slurry in reactor 1 is chlorinated as described above. The formed crystals of neutral calcium hypochlorite, which have excellent filterability are delivered from this vessel to a filter 4 along line 3 for subsequent drying and recovery.

In filter 13 one discards to waste along 17 the solids recovered, and the filtrate is blended with filtrate from filter 8 along line 18.

Having returned the basic crystals, now substantially free from ferrates and/or ferrites, recovered on filter 8 to reaction vessel 1 for chlorination as previously described, the cycle is complete and all steps are again repeated. It can be seen that all hydrated lime is added to the process along lines 2 and 7, and hence all iron impurities are added at these stages. By controlling the relative amounts added through the two lines it can be assured that the small quantity of iron introduced through line 2 remains in solution while the much larger quantity introduced through line 7 is reacted with the additive added to vessel 6 and the major portion of the formed salt removed from the process in settler 3.

In the above embodiment the reagent is added to the slurry in reaction vessel 6. The same results can also be achieved if the reagent is added elsewhere but prior to final chlorination. The important point is that the ferrate and/or ferrite salts are separated from the dibasic crystals before the final chlorination is effected.

The process as illustrated by the flow diagram is cyclic and only the solids separated on filter 13 containing the undesirable ferrate and/or ferrite ions in the form of salts are discharged to waste.

The following examples further illustrate the process of the invention.

In all the examples the hydrated lime used contained 97.5 percent calcium hydroxide, 0.3 percent unreacted calcium oxide, 0.2 percent iron and 0.3 percent manganese.

EXAMPLE 1

1,303 g of hydrated lime was slurried in a reaction vessel with 2,180 water, 30 g barium chloride and 4,900 g of a solution containing 2.8 percent calcium hypochlorite, 18.3 percent calcium chloride and 0.13 percent calcium hydroxide, with balance being water (solution A). The slurry was chlorinated to yield dibasic calcium hypochlorite crystals and divided into two parts I and II.

Part I was allowed to settle in a settling tank. The sludge/supernatant mother liquor, containing barium ferrate and/or ferrite, was withdrawn and discharged to waste and the dibasic crystals after filtration gave the following chemical analysis:

| $Ca(OCl)_2$ | $CaCl_2$ | $Ca(OH)_2$ |
|---|---|---|
| 16.7% | 14.9% | 22.6% |

The crystals ranged in size from 60 $\mu$ to 400 $\mu$.

1000 g of this basic crystal cake were slurried with 575 g of water and 115 g of the solution A. After chlorination with chlorine gas, crystals of neutral calcium hypochlorite having the following composition were obtained:

| $Ca(OCl)_2$ | $CaCl_2$ | $Ca(OH)_2$ |
|---|---|---|
| 15.6% | 14.2% | 0.3% |

The filterability of the slurry was extremely good and when examined under a microscope the neutral crystals were found to be tetragonal, well-shaped with a clear background and averaged in size from 80 $\mu$ to 120 $\mu$.

1,325 g of the filtrate from the neutral crystal filtration was used to form further crystals of the dibasic crystal in a reaction vessel. 130 g of hydrated lime was added to this vessel together with 250 g of the solution A. Chlorination was achieved solely by use of hypochlorite in the system. The resultant slurry was again divided into two parts IA and IIA. Part IA was allowed to settle and when treated similarly to the treatment given to part I gave the same good results. It is to be noted that the solution A consists of filtrate from filtering the basic crystals. This filtrate is substantially free of dissolved or undissolved iron.

EXAMPLE 2

Parts II and IIA from Example 1 were filtered without prior settling in a tank. The resulting dibasic crystals were slurried and chlorinated as described in Example 1. Similar analytical results were obtained, but the filtering of the neutral crystals was difficult. The crystals were generally highly twinned and much smaller, and the background was not clear. This example serves to illustrate the significance of removing the ferrate and/or ferrite salt from the basic crystals by settling.

EXAMPLE 3

The same procedure as for Example 1 was followed except that the barium chloride was replaced by 30 g of zinc chloride.

After settling and discarding the mother liquor suspension the composition of the dibasic crystals was:

| $Ca(OCl)_2$ | $CaCl_2$ | $Ca(OH)_2$ |
|---|---|---|
| 14.7% | 14.0% | 15.2% |

Chlorination of the dibasic crystals in slurry medium produced neutral crystals having the following composition:

| $Ca(OCl)$ | $CaCl_2$ | $Ca(OH)_2$ |
|---|---|---|
| 15.9% | 14.8% | 0.7% |

Filtration of this slurry was good, the neutral crystals were tetragonal, well shaped with a clear background and averaged in size from 80 $\mu$ to 120 $\mu$.

EXAMPLE 4

The procedure of Example 2 was followed, except that the parts II and IIA were replaced by similar parts obtained from Example 3.

The analytical composition of the neutral crystals was similar to the crystals of Example 3, but the filterability was poor, the crystals were broken and highly twinned with a fair to poor background. The size of the crystals averaged less than 60 $\mu$.

EXAMPLE 5

The procedure in Example 1 was followed, but no barium chloride, zinc chloride or other additive was used. On settling of the dibasic crystals no sludge layer was discernable, only a clear supernatant mother liquor. The dibasic crystals prepared gave the following chemical composition:

| $Ca(OCl)_2$ | $CaCl_2$ | $Ca(OH)_2$ |
|---|---|---|
| 15.9% | 9.6% | 18.4% |

The crystal size was of the order of 60 $\mu$ to 350 $\mu$. These crystals, when slurried and chlorinated as described in Example 1 yielded a slurry of the following composition:

| $Ca(OCl)_2$ | $CaCl_2$ | $Ca(OH)_2$ |
|---|---|---|
| 18.0% | 14.6% | 1.0% |

Microscopical examination of the neutral crystals filtered from this slurry showed that they were broken and highly twinned with a fair to poor background. The size was smaller and ranged up to 60 $\mu$. Filterability was poor.

Further preparation of dibasic crystals by precipitation from the filtrate and chlorination as described in Example 1 did not improve the size or the shape of the crystals, nor the filterability.

In this example, as in Example 1, the solution A was derived from the filtrate after filtering the basic crystals. Since there was no precipitating additive, this filtrate contained a substantial quantity of dissolved and undissolved iron and it was this iron which interfered with the production of good neutral crystals. Of course, the basic crystals also contained interfering iron.

I claim:

1. A process for producing crystals of neutral calcium hypochlorite of good filterability from a lime containing at least about 600 parts per million by weight of iron as Fe comprising reacting a slurry of lime with a chlorinating agent to form crystals of a basic calcium hypochlorite, forming a substantially insoluble salt with the iron-containing ions in the slurry, separating the salt from the basic crystals, and converting the basic crystals so obtained into crystals of neutral calcium hypochlorite.

2. A process according to claim 1 characterised in that the separation is achieved by allowing the basic crystals to settle out of the slurry and removing the supernatant suspension containing the salt from the basic crystals.

3. A process according to claim 1 characterised in that the salt is formed by adding to the slurry ions selected from barium, strontium, cadmium, zinc, mercury and silver ions.

4. A process according to claim 2 characterised in that the salt is formed by adding to the slurry ions selected from barium, strontium, cadmium, zinc, mercury and silver ions.

5. A process according to claim 2 characterised in that residual mother liquor is removed from the basic crystals and at least a part of this mother liquor is utilised as a part of the slurry medium.

6. A process according to claim 1 characterised in that the reaction of the slurry of lime with the chlorinating agent is controlled to produce crystals of dibasic calcium hypochlorite.

7. A process according to claim 5 characterised in that the reaction of the slurry of the lime with the chlorinating agent is controlled to produce crystals of dibasic calcium hypochlorite.

8. A process according to claim 1 characterised in that the chlorinating agent is selected from the group consisting of chlorine gas, a hypochlorite, hypochlorous acid and chlorine monoxide.

9. A process according to claim 1 characterised in that the basic crystals are converted to the neutral crystals by making a slurry of the basic crystals and reacting the slurry with a chlorinating agent selected from the group of chlorine gas, a hypochlorite, chlorine monoxide, and hypochlorous acid.

10. A process according to claim 7 characterised in that the basic crystals are converted to the neutral crystals by making a slurry of the basic crystals and reacting the slurry with a chlorinating agent selected from the group of chlorine gas, a hypochlorite, chlorine monoxide and hypochlorous acid.

11. A process for producing crystals of neutral calcium hypochlorite of good filterability from a lime containing about 600 or more parts per million by weight of iron as Fe comprising reacting a slurry of the lime with a chlorinating agent to form crystals of a basic calcium hypochlorite, introducing to the slurry ions selected from the group consisting of barium, zinc, cadmium, strontium, mercury and silver ions, allowing the basic crystals to settle out of the slurry, removing the supernatant suspension from the crystals, making a slurry of the basic crystals and reacting the slurry of basic crystals with a chlorinating agent to form crystals of neutral calcium hypochlorite, and recovering the neutral crystals.

12. A process according to claim 11 characterised in that residual mother liquor is removed from the basic crystals and at least a part of this mother liquor is used as a part of the medium for the slurry of lime.

13. A process according to claim 12 characterised in that the chlorinating agent is selected from the group consisting of chlorine gas, chlorine monoxide, hypochlorous acid and a hypochlorite.

* * * * *